United States Patent [19]
Schnable

[11] Patent Number: 5,815,559
[45] Date of Patent: Sep. 29, 1998

[54] METHOD FOR SELECTING AMA RECORDS USING DIRECTORY NUMBERS

[75] Inventor: Andrew Thomas Schnable, Naperville, Ill.

[73] Assignee: Lucent Technologies Inc., Murray Hill, N.J.

[21] Appl. No.: 919,874

[22] Filed: Aug. 28, 1997

Related U.S. Application Data

[63] Continuation of Ser. No. 426,304, Apr. 21, 1995.

[51] Int. Cl.$^6$ ................................................ H04M 15/00
[52] U.S. Cl. ..................... 379/112; 379/92.01; 379/114; 379/124; 379/126; 379/222
[58] Field of Search ................................. 379/111, 112, 379/114, 115, 116, 118, 119, 120, 121, 123, 127, 219, 229, 230, 133, 134, 135, 222, 243, 244, 245, 92.01, 92.03, 124, 126; 455/406

[56] References Cited

U.S. PATENT DOCUMENTS

| | | | |
|---|---|---|---|
| 3,551,599 | 12/1970 | White ........................................ | 179/7.1 |
| 3,855,420 | 12/1974 | Steidl ....................................... | 179/17 A |
| 3,934,090 | 1/1976 | Curtis et al. ........................... | 179/7.1 R |
| 3,944,746 | 3/1976 | Burns et al. ............................ | 179/7.1 R |
| 4,007,336 | 2/1977 | Hutton, Sr. ............................... | 179/18 |
| 4,027,104 | 5/1977 | Levitt et al. ............................. | 179/7 R |
| 4,058,680 | 11/1977 | Curtis ....................................... | 179/7.1 R |
| 4,147,902 | 4/1979 | Dworak ............................... | 179/175.2 R |
| 4,525,601 | 6/1985 | Barnich et al. .......................... | 379/119 |
| 4,757,529 | 7/1988 | Glapa et al. ............................. | 379/244 |
| 4,776,004 | 10/1988 | Bauer et al. ............................. | 379/127 |
| 5,008,929 | 4/1991 | Olsen et al. ............................. | 379/115 |
| 5,103,475 | 4/1992 | Shuen ....................................... | 379/115 |
| 5,291,543 | 3/1994 | Freese et al. ............................ | 379/114 |
| 5,483,590 | 1/1996 | Chiu et al. ............................... | 379/269 |
| 5,509,055 | 4/1996 | Ehrlich et al. ........................... | 379/113 |
| 5,606,601 | 2/1997 | Witzman et al. ........................ | 379/114 |

*Primary Examiner*—Curtis A. Kuntz
*Assistant Examiner*—Binh K. Tieu
*Attorney, Agent, or Firm*—Mony R. Ghose

[57] ABSTRACT

In an automatic message accounting (AMA) record distribution network, a method and system for sorting AMA records by using an area code or numbering plan area (NPA) data array and directory number bit maps to identify AMA records which are of interest to an operation center. Operation centers have access to every AMA record generated by a toll switching network and are initialized with a table of AMA structure and call-type codes, an NPA data array and directory number bit maps. NPA entries in the data array which are of interest to a particular operation center contain pointers (i.e., memory address locations) of the directory number bit maps. As AMA records are received by the operation center, directory numbers which have NPAs of interest to the operation center are compared to directory number bit maps. A directory number of an AMA record which corresponds to a numbered bit position of the directory number bit map is processed by the operation center. AMA records which contain directory numbers which do not have NPAs of interest to the operation center, or which do not correspond to a directory number bit map are discarded.

3 Claims, 6 Drawing Sheets

METHOD FOR SELECTING AMA RECORDS USING DIRECTORY NUMBERS

This application is a continuation of application Ser. No. 08/426,304, filed Apr. 21, 1995.

FIELD OF THE INVENTION

This invention relates to telephone switching systems and, more particularly, to decentralized sorting and processing of Automatic Message Accounting (AMA) records using bit mapping techniques.

BACKGROUND OF THE INVENTION

In the telecommunications industry, certain classes of telephone calls are subject to toll tariffs. In the United States, toll classes of calls (i.e. toll calls) are generally referred to as long distance telephone calls. A common way to initiate a long distance all is to dial a ten digit number: three digits designating a numbering plan area (NPA), followed by three digits defining a terminating switch in the NPA and four subscriber identification digits.

When a calling party initiates a long distance call in the above-described manner, the call is routed from the local exchange which serves the calling party to a toll switching network, as is known in the art. The toll switching network is comprised of multiple switches (such as the 4ESS® switch manufactured and sold by AT&T Network Systems) which connect calls between a calling party served by a first local exchange carrier and a called party served by a second local exchange carrier. Each use of the toll switching network causes a party (usually the calling party) to incur a tariff. Accumulated tariffs for toll calls are remitted by telephone customers upon receipt of an itemized bill including each toll call made during a prescribed billing period.

To facilitate the billing process for long distance calls, an Automatic Message Accounting (AMA) record is generated for each use of the toll switching network. An AMA record for a typical long distance call includes information such as the calling party's directory number, the dialed directory number and duration of the call. Other information such as predefined structure codes and call type codes are also part of an AMA record to further identify the call.

To provide the directory number necessary for the AMA record, each local exchange includes automatic number identification (ANI) equipment which identifies and transmits the calling station directory number to an ingress switch (i.e. the switch which serves the calling party) in the toll switching network.. The called station directory number and the switching system trunk equipment employed to establish the call connection is also received at the ingress switch to provide information needed for the structure code and call code.

The duration of the call is determined by a process in which the ingress switch detects answer of the call at the called station and records an entry which establishes the time that the call was answered. Upon completion of the call, the ingress switch detects disconnect of the calling and called stations from the call connection and records a disconnect time entry.

AMA records are accumulated in a toll switch prior to transmission of the records to one of a plurality of host collector sites where the records are transcribed to a storage medium, such as magnetic tape. A central distribution center receives the stored AMA records from the host collectors sites and sorts the records using protocols which are known in the art. The sorted records are transmitted by the central distribution center to various operation centers based upon a relatively rigid hierarchy (e.g. predefined structure codes). The inflexibility of the distribution hierarchy is necessary to avoid the interruption in processing that would result in the AMA record distribution network if the central distribution center were to be programmed with new distribution protocols.

Although AMA records are generally referred to as "billing data," AMA records are used by a number of operations centers for a variety of purposes such as fraud detection or marketing support, as well as billing. During periods of peak usage of the toll switching network in the United States, many millions of AMA records are generated per hour. Conventional processing techniques may require 3–5 days before a central distribution center receives AMA records from all of the host collector sites and delivers each AMA record to one or more appropriate operation centers for further processing. As the time period between generation of the AMA record and final processing of the record by an operation center grows, so does the back log of records.

Nonetheless, processing by the central distribution center is necessary because operation centers do not currently possess the ability to efficiently sort through all of the AMA records generated by the toll switching network in order to find those records which are of interest to that particular center. In addition to the delay associated with deferred sorting of AMA records at a central location, the inflexible distribution protocols of the central distribution center results in the lack of ability to adapt to new billing programs which may require alternative AMA record distribution patterns.

Therefore, there is a need in the art for a stream-lined process in which AMA records can be efficiently sorted by an operation center which has access to a continuous stream of AMA records being generated by a switching system, and which is adaptive to changes in distribution protocols.

SUMMARY OF THE INVENTION

This need is addressed and a technical advance is achieved in the art by a method and system in which each operation center is equipped with a filter routine which uses bit maps to identify and retrieve AMA records on the basis of a directory number contained in the AMA record.

In an exemplary embodiment of the method and system of the present invention, each operation center is in direct communication with each host collector site in an AMA record distribution network. Collectively, the host collector sites receive a continuous data stream of all AMA records generated by a toll switching network. Accordingly, the operation center also has access to every AMA record generated by the toll switching network. Prior to receiving the AMA records, the operation center is initialized with pre-determined information which enables the center to identify AMA records of interest, a table of structure and call-type codes and a data array comprising a list of each NPA in the United States. NPAs which are determined to be "of interest" to a particular operation center are marked with memory address locations (i.e., "pointers") of directory number bit maps which are also stored in the billing operation center during an initializing process. Each directory number bit map includes a numbered bit position which corresponds to seven digits of a directory number defined to be of interest to the center.

As AMA records are received from the host collector sites, records which include a directory number that corresponds to a numbered bit position of the directory number bit map are identified to be "of interest" to the operation center and are retrieved from the AMA record data stream for further processing. If there is no match between the directory number in the AMA record and a numbered bit position of a directory number bit map, the record is discarded and the next AMA record is evaluated.

DETAILED DESCRIPTION

Figure 1A:
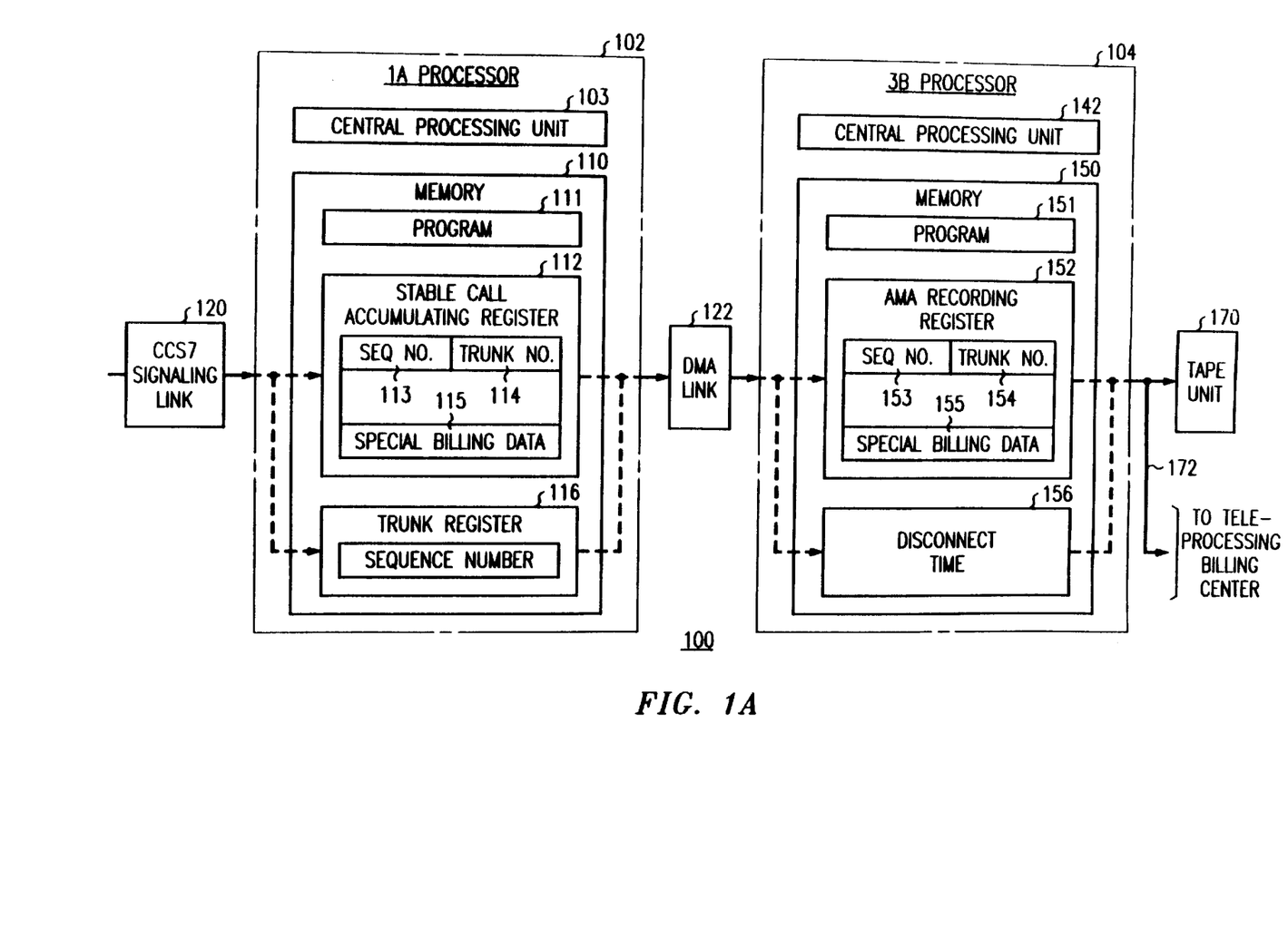
FIG. 1A is a simplified block diagram of an exemplary embodiment of a switch which generates AMA records in a toll switching network.

FIG. 1A is a block diagram of one exemplary embodiment of AMA record generating equipment in switch 100. This particular embodiment is implemented in the 4ESS switch manufactured by AT&T Network Systems, and described in *The Bell System Technical Journal* (BSTJ), September, 1977. The call control processor of the 4ESS is 1A processor 102 described in BSTJ, February, 1977. This processor communicates with an auxiliary processor, 3B processor 104 described in BSTJ, January, 1983, Part II, and is used for formatting AMA data to be recorded on tape unit 170 or transmitted over data link 122 to a host collection site (not shown).

Information about a call is typically received in the form of an initial address message over a common channel signaling data link such as CCS7 signaling link 120. In response to the address message, 1A processor 102 which is controlled by central processing unit 103 (under the control of the program 111 stored in memory 110) allocates a stable call accumulation register (SCAR) 112 in memory 110 for accumulating billing information. A sequence number (SN) 113 is assigned for use in reference to the call. If the call is one which requires accessing a database shared by many toll switches (e.g. "800" calls), the shared database (not shown) is queried over the CCS7 signaling link 120. Special billing data is returned from the database via data link 120 and stored in location 115.

When a call is established and the called party answers the call, an answer signal is received over CCS7 signaling link 120. Two seconds after an answer has been received, appropriate data (including special billing data 115) is transmitted via a direct memory access (DMA) link 122 to the 3B processor 104. The 3B processor records the AMA data in an AMA recording register (AMARR) 152 within memory 150 of the processor. The 3B processor is controlled by central processing unit 142 acting under the control of program 151 stored in memory 150. AMARR 152 is assigned in memory 150 and stores sequence number 153, trunk number 154 of the incoming trunk used in the call and special billing data 155 for the call. All data records are retained until the call is disconnected.

When the call disconnects, a disconnect indication is received over CCS7 signaling data link 120. A block of memory associated with the outgoing trunk, block 116, is accessed by the 1A processor to find the sequence number of the call. Data comprising the sequence number for the call and the time of the disconnect is sent over DMA link 122 to 3B processor 104. When the data is received in 3B processor 104, the sequence number and the incoming trunk number are used to find the AMARR for the call and the disconnect time is then entered in temporary buffer memory location 156. Under the control of program 151, the contents of AMARR 152 and location 156 are then formatted for an AMA record and the message containing this formatted data is either sent to an AMA tape unit 170 or is sent over a data link 172 to a host collection site (not shown).

Figure 1B:
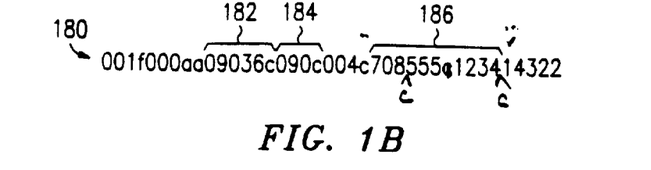
FIG. 1B is an exemplary embodiment of a portion of an AMA record generated by switch 100 in FIG. 1A.

FIG. 1B is a exemplary embodiment of an AMA record generated by switch 100 in FIG. 1A. For simplicity, only a portion 180 of a complete AMA record is shown. AMA record portion 180 includes segments 182, 184 and 186. Segment 182 represents the structure code associated with this particular record. Structure code "09036c" signifies that the AMA record is a station-to-station long distance call. Segment 184 is the call-type code of the record. In this example, call-type code "090c" indicates that the long distance call is to be billed to the calling station. Segment 186 (i.e. "708-555-1234") identifies the calling station directory number.

Figure 2:
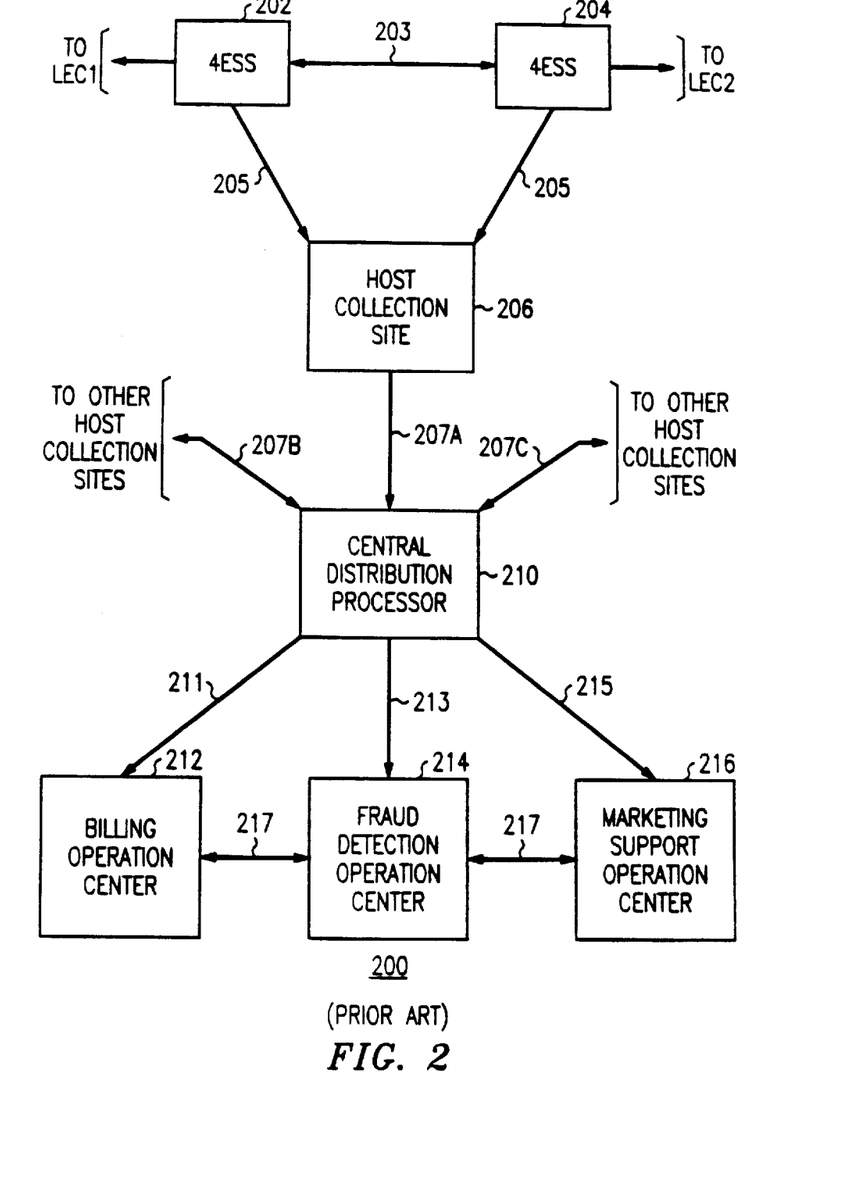
FIG. 2 is a simplified block diagram of a prior art AMA record distribution network.

FIG. 2 is a simplified block diagram of prior art AMA record distribution network 200. AMA record distribution network 200 includes switches 202 and 204 which 4ESSs are manufactured by AT&T Network Systems and described in detail in FIG. 1 above. Toll switches 202 and 204 are representative of a toll switching network which is used to connect, for example, calls between parties served by a first local exchange carrier (LEC 1) and parties served by a second local exchange carrier (LEC 2). Switches 202 and 204 communicate with each other over common channel signaling data link CCS7 203, as is known in the art. For clarity, only two toll switches are shown but an operational toll network contains many more switches.

Toll switches 202 and 204 generate AMA records in the manner described in FIG. 1 above. Generally, each switch accumulates a number of AMA records before transmission of the records to one of a plurality of host collection sites, such as host collection site 206, over data links 205 in response to a polling message from the host collection site. Once the AMA records are received, host collection site 206 transcribes the records onto a storage medium, such as magnetic tape.

AMA records are retained by host collection site 206 until a request for of AMA records is received by the host collection site from central distribution processor 210. In response to the request, host collection site 206 releases of AMA records for transmission to central distribution processor 210 over data link 207A. Distribution processor 210 also receives AMA records from other host collection sites throughout AMA record distribution system 200 over data links 207B and 207C. Every AMA record which is stored in a host collection site is ultimately delivered to central distribution processor 210.

Central distribution processor 210 sorts the AMA records received from the host collection sites using an established sorting protocol which uses structure and call-type codes. Due to the massive number of AMA records which generated by the toll switching network at any given time, the central distribution processor cannot efficiently sort AMA records by directory number. Therefore, processing which requires record-specific information, such as directory numbers, is done at the operation centers.

Also shown are billings operation center 212, fraud detection operation center 214 and marketing support operation center 216. The operation centers communicate with distribution processor 210 via data links 211, 213 and 215, respectively. The operation centers communicate with each other over data links 217. For clarity, only three operation centers are shown but an operational AMA record distribution network includes many other centers. On a prescribed periodic basis, central distribution processor 210 transmits a batch of AMA records (sorted on the basis of structure and call-type codes) over a data link (e.g., data link 211, 213 or 215) to an appropriate operation center.

AMA records received at an operation center undergo further processing. For example, assume that billing operation center 212 is responsible for generating itemized long distance bills. In accordance with conventional techniques, center 212 maintains account files organized by customer directory numbers. On a monthly basis, a directory number is retrieved from an account file to determine if it matches with any station-to-station, calling station initiated directory numbers contained in the AMA records received from central distribution processor 210. If there is a match, that particular AMA record is used to derive other pertinent information (such as call duration, etc.) in order to generate an itemized long distance bill for the account.

Figure 3A:
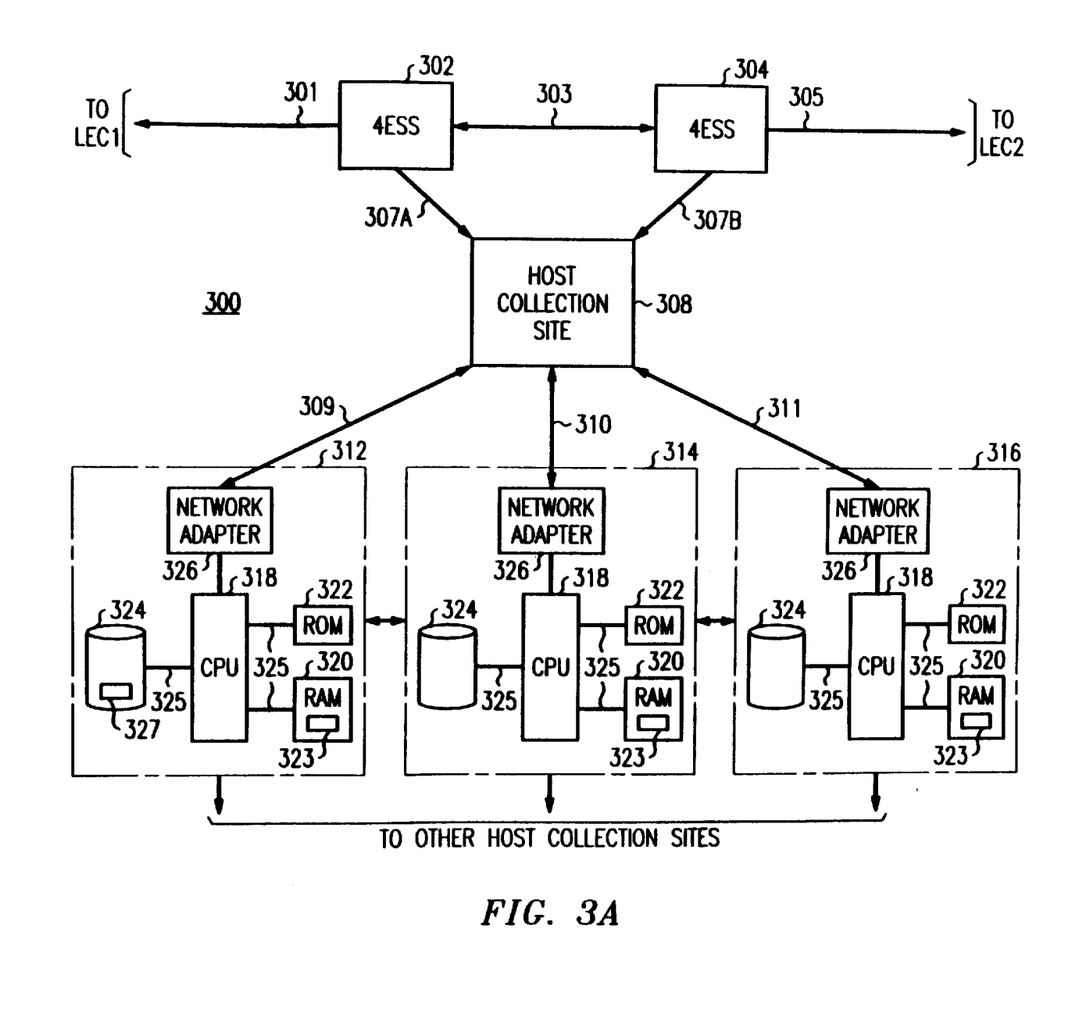
FIG. 3A is a simplified block diagram of an AMA record distribution network in accordance with an exemplary embodiment of the present invention.

FIG. 3A is a simplified block diagram of AMA record distribution network 300 in accordance with an exemplary embodiment of the present invention. AMA record distribution network 300 includes switches 302 and 304 which are 4ESS switches manufactured by AT&T Network Systems and described in detail in FIG. 1 above. Toll switches 302 and 304 communicate with each other via common channel signaling CCS7 link 303 to enable call connections between customers served by a first local exchange carrier (LEC 1) and customers served by a second local exchange carrier (LEC 2).

As call connections between parties are completed using the toll switching network which employs toll switches 302 and 304, AMA records for each call are generated in the manner described in FIG. 1 above. Although only two switches are shown, it is to be understood that an operational toll network includes many more switches. Accumulated AMA records are stored in each switch until a request for AMA records is received from one of the host collection sites, such as host collection site 308. In response to the request, a batch of AMA records is transmitted to host collection site 308 from switch 302 and switch 304 over data links 307A and 307B, respectively.

Also shown are billing operation center 312, fraud detection operation center 314 and marketing support operations center 316 which communicate with host collection site 308 via data links 309, 310 and 311, respectively. Each operation center includes a central processing unit (CPU) 318 which communicates with random access memory (RAM) 320, read only memory (ROM) 322, non-volatile database 324 and network adapter 326 via data buses 325. For clarity, only billing operation center 312 is described in detail below.

Database 324 of billing operation center 312 includes table 327 which contains a directory of structure, call-type codes and other information about AMA records relating to structure code and call-type codes. In an alternative embodiment, structure and call-type codes could be stored as bit maps. Database 324 also stores accounts files of customer directory numbers which are of interest to the billing operation center. RAM 320 includes filter routine 323 which enables each operation center to sort through all of the AMA records generated by the toll switching network and to identify those records which are of interest to the center. Filter routine 323 operates in conjunction with data arrays and bit maps which are also stored in RAM 320 during an initializing process.

Figure 3B:
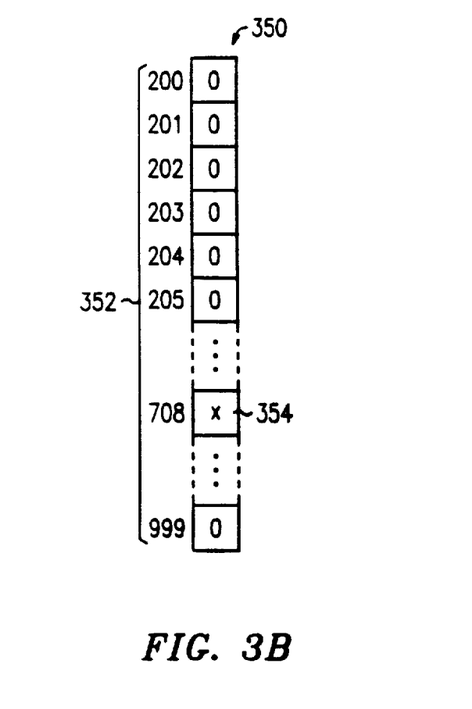
FIG. 3B is a graphical representation of an NPA data array.

FIG. 3B is a graphical representation of data array 350 which is stored in RAM 320 and used by billing operation center 312 in conjunction with filter routine 323 to sort AMA records. In this example, data array 350 comprises a list of all possible NPAs in the United States. An NPA code in the United States cannot begin with the number "0" or "1". Hence, data array 350 has 799 entries in a list starting with NPA "200" and ending with NPA "999". For purposes of example, assume that the only AMA record of interest to operation center 312 is one which contains calling station directory number "708-555-1234". To identify the NPA of the directory number (i.e., "708") as an NPA of interest, data array 350 includes "pointer" 352 (represented by the letter "X") at the entry corresponding to NPA "708". A pointer is a memory address location which is used by filter routine 323 to locate information stored in RAM 320. In this example, the information stored at the memory address location specified by pointer 352 is directory number bit map 360 of a calling station identified by the number "555-1234".

Figure 3C:
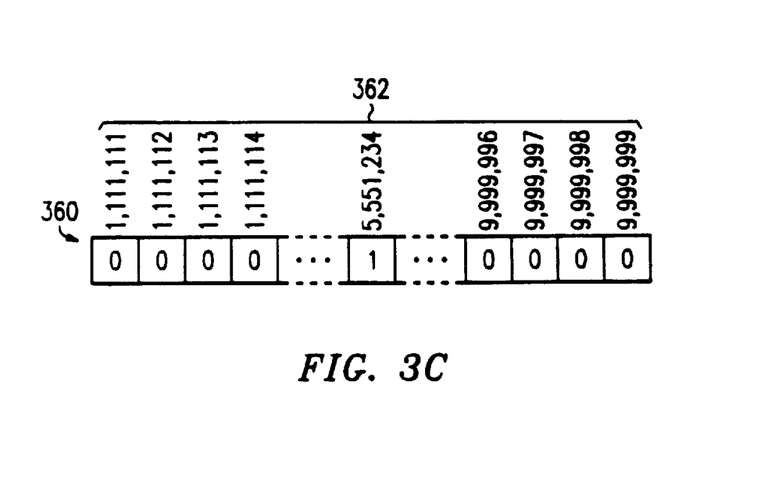
FIG. 3C is a graphical representation of a bit map for a given directory number in an NPA.

FIG. 3C is a graphical representation of a directory number bit map 360 which is used to identify the directory number "555-1234" as a number of interest. A bit map is a means of encoding decision information in compact form. In this example, bit map 360 is an array comprising numbered bit positions 362 which range from 1,111,111 to 9,999,999. Continuing with the above example, assume that the only directory number of interest to billing operation center 312 is "708-555-1234". Accordingly, each numbered bit position in bit map 360 is filled with zeros except the 5, 551,234th bit position which contains a binary bit "1" indicating that the directory number which corresponds to that bit position (i.e. "555-1234") is of interest to billing operation center 312. In this example, bit map 360 could have been collapsed using a "run-length" encoding technique which is known in the art.

In operation, CPU 318 of billing operation center 312 continually issues requests to host collection site 308 to receive a data stream of AMA records via data link 309 and network adapter 326. Each AMA record is processed using filter routine 323 (described in detail below) to determine whether the AMA record is of interest to the billing operation center. The AMA records which are deemed to be of interest to the center are retained in RAM 320 for further processing. Those records which are not deemed to be of interest to a particular operation center are discarded.

In an exemplary embodiment, each operation center has access to the AMA records stored in every host collection site in AMA record distribution network 300. Since the host collection sites collectively receive all of the AMA records generated by the toll switching network (in this example, the toll switching network is represented by switches 302 and 304), it follows that each operation center also receives all generated AMA records. In an alternative embodiment, each operation may be in direct communication with each switch in a toll switching network so that the host collector sites may be eliminated altogether.

Figure 4A:
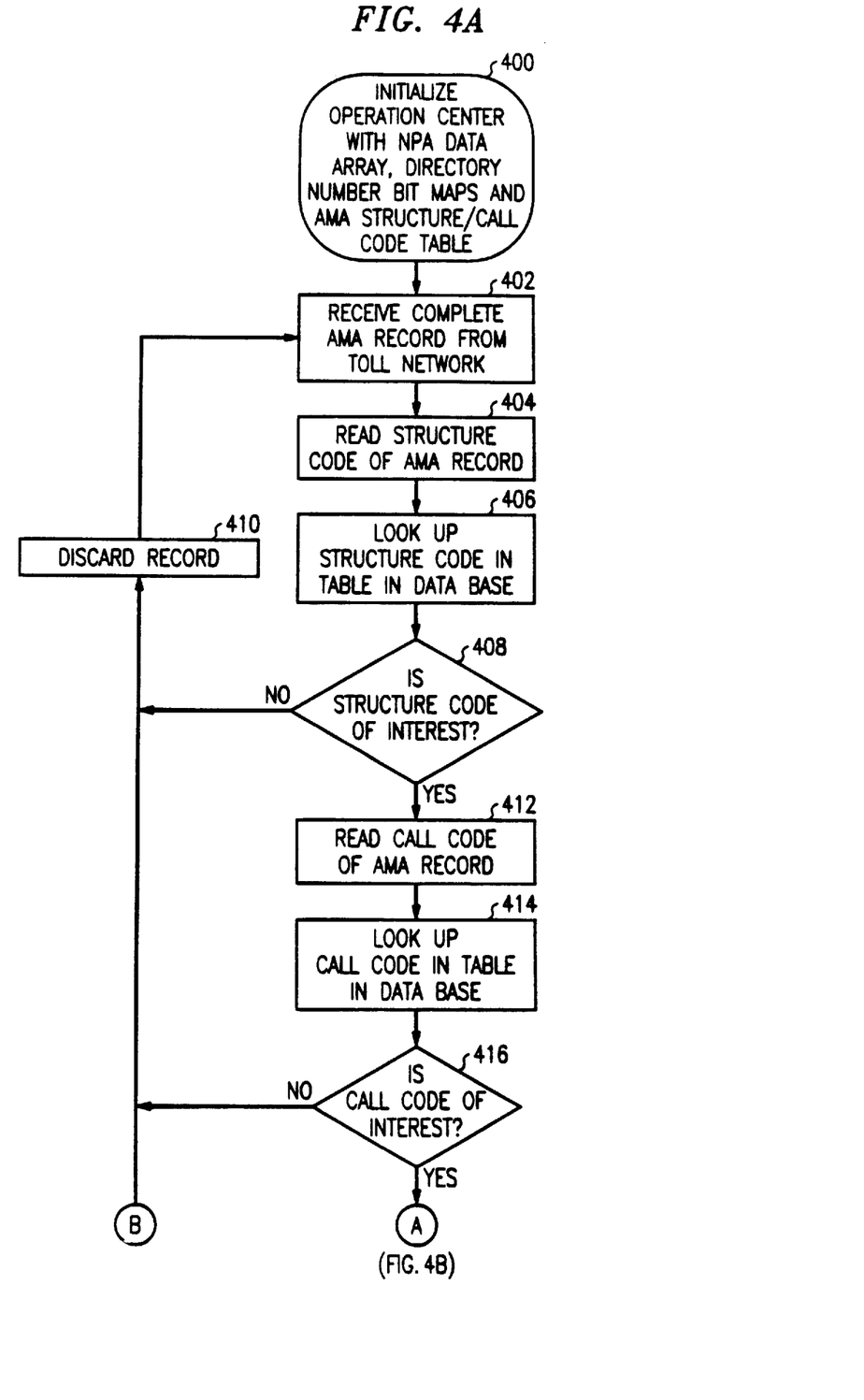
FIGS. 4A and 4B are flow diagrams of the method steps for controlling an operation center in an AMA record distribution network in accordance with an exemplary embodiment of the present invention.
Figure 4B:
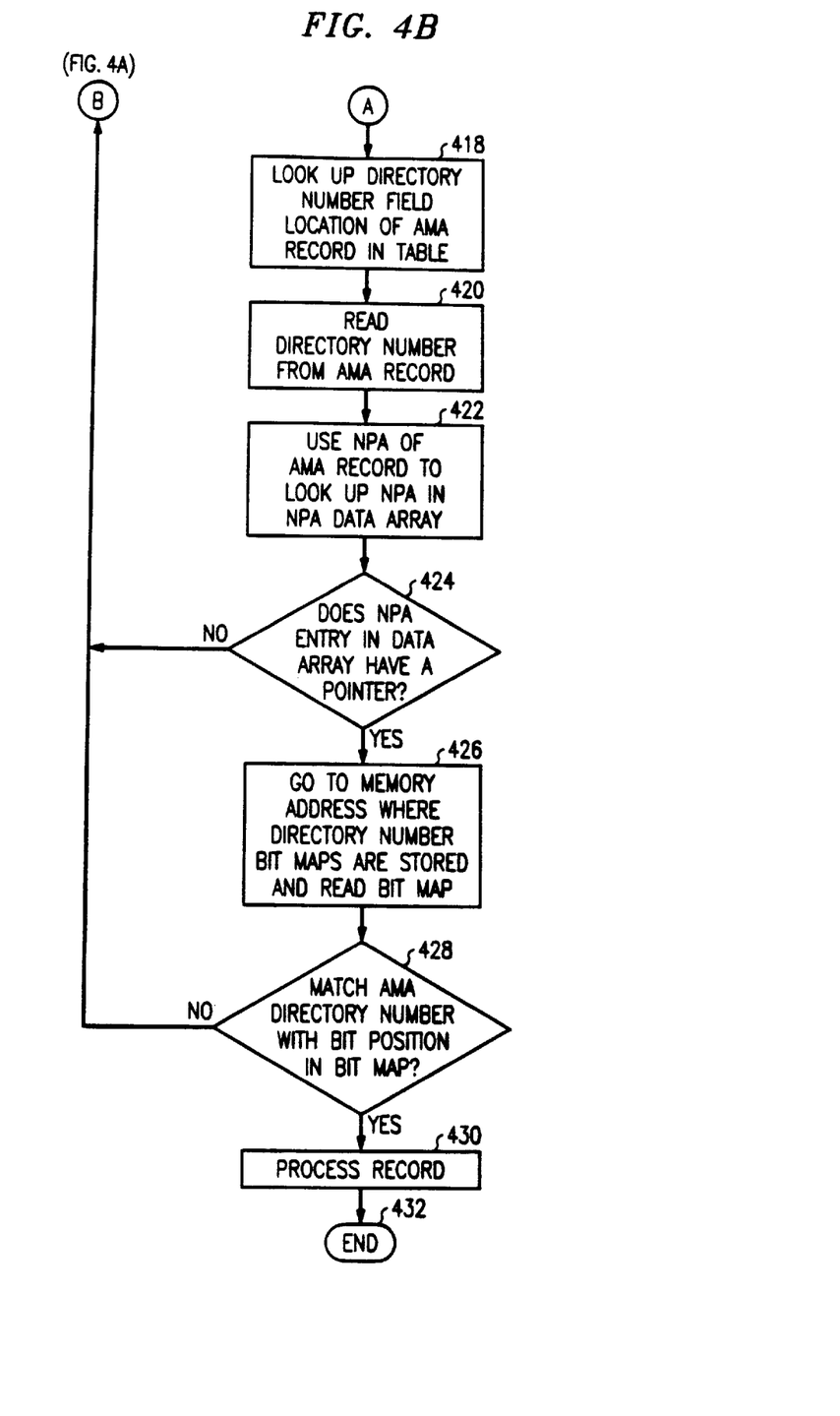

FIG. 4 is a flow diagram exhibiting the method steps performed by billing operation center 312 of AMA record distribution network 300 in accordance with an exemplary embodiment of the present invention. For clarity, continue with the above example in which an AMA record containing a calling station directory number of "708-555-1234" is the only record of interest to billing operation center 312.

The process begins in step 400 in which the operation center is initialized by storing table 327 comprising a directory of structure codes and call-type codes in database 324, and data array 350 and its corresponding directory number bit map 360 in RAM 320. It is assumed that operation center 312 maintains account files and continually receives a data stream of AMA records from host collection site 308.

The process continues to step 402 in which a complete AMA record is read. In step 406 a look-up of the structure code in the AMA record is performed using structure/call type code table 327. Structure codes are used to identify a category of call, such as an "800" call, station-to-station call or directory assistance call.

The process continues to decision step 408, where it is determined whether the structure code of the AMA record is of interest to the operation center. In this example, assume that only "station-to-station" calls are of interest to billing operation center 312. If the outcome of decision step 408 is a "NO" decision, the process continues to step 410 where this particular AMA record is discarded and the process returns to step 402 where the next AMA record is read.

If the outcome of decision step 408 is a "YES" decision, the process continues to step 412 where the call-type code of the AMA record is read. In step 414, a look-up of the call-type code is performed using table 327 in database 324. The process continues to decision step 416, where it is determined whether the call-type code is of interest to the operation center. Call-type codes are more specific than structure codes and identify calls by categories such as "local coin call" or "calling station initiated call". In this example, only calling station initiated calls are of interest to billing center 312. If the outcome of decision step 416 is a "NO" decision, the process returns to step 410 in which this particular AMA record is discarded and the same process as described above for retrieving the next AMA record is performed. If the outcome of decision step 416 is a "YES" decision, the process continues (through connector A to FIG. 4B) to step 418 in which a look-up of the calling station directory number field location of this particular type of AMA record is performed. Calling station directory number field location information is related to the structure code and call-type code of an AMA record and hence, is found in table 327 in database 324.

The process continues to step 420 in which the calling station directory number of the AMA record is read. In step 422, the NPA of the calling station directory number obtained from the AMA record is used to target the matching NPA in data array 350 stored in RAM 320. In decision step 424, it is determined whether the NPA number of the calling station directory number is of interest (i.e. whether the matching NPA in data array 350 has a pointer). If the outcome of decision step 424 is a "NO" decision, the process continues to step 410 where the AMA record is discarded and the next AMA record is retrieved in the process described above. If the outcome of decision step 424 is a "YES" decision, the process continues to step 426 in which directory number bit map 360 is accessed and read. Directory number bit map 360 is accessed in RAM 320 by using the memory address location retrieved from pointer 352 in data array 350. In decision step 428 it is determined whether the remaining portion (i.e. all digits except the NPA digits) of the calling station directory number in the AMA record contains a binary bit "1" in a corresponding numbered bit position in directory number bit map 360. In this example, directory number "555-1234" corresponds to numbered bit position 5, 551,234. If the outcome of decision step 428 is a "NO" decision, the process continues to step 410 where the AMA record is discarded and the next AMA record is retrieved in the manner described above. If the outcome of decision step 428 is a "YES" decision, the process continues to step 430 in which the operation center processes the AMA record using known techniques and the sorting process ends in step 432.

Although in the above example AMA records were sorted on the basis of a directory number (i.e. NPA-NNX-XXXX), filter routine 323 can be altered to accommodate any sorting process desired by the operation center. The method and system of the present invention is more efficient than the prior art in that AMA records can be directly received, sorted and processed by each operation center and thereby, eliminates the need for partial and deferred processing at a central distribution center. Further, since each operation center can use an alterable filter routine to sort and identify all AMA records which are of interest to a particular center, changes in the sorting and distribution process may be readily accommodated by changing the filter routine. It is to be understood that the above-described embodiments are for illustrative purposes only and that numerous other arrangements of the invention may be devised by one skilled in the art without departing from the scope of the invention.

The invention claimed is:

1. In an automatic message accounting (AMA) record distribution network, a method for processing AMA records, the method comprising the steps of:

initializing operation centers by storing a table of AMA structure codes and call-type codes in a database of the operation center;

receiving a substantially real time data stream of all AMA records in said operation centers from host collector sites;

determining upon receipt of an AMA record in at least one operation center whether the received AMA record is of interest to the operation center by performing a look-up of a number plan area (NPA) of a directory number contained in the AMA record in a data array stored in the operation center and by determining if an NPA entry in the data array which matches the NPA of the directory number has a pointer;

the operation center further processing only the AMA records selected to be of interest;

the operation center discarding the AMA records not selected to be of interest:

storing at least one bit map in a memory wherein the bit map identifies the AMA records selected to be of interest;

determining if a record received from the network corresponds to the bit map; and responsive to determining that the record corresponds to the bit map, performing bill processing operations using the AMA record.

2. In an automatic message accounting (AMA) record distribution network, a method for processing AMA records, the method comprising the steps of:

initializing operation centers by storing a table of AMA structure codes and call-type codes in a database of the operation center;

receiving a substantially real time data stream of all AMA records in said operation centers from host collector sites;

determining upon receipt of an AMA record in at least one operation center whether the received AMA record is of interest to the operation center by locating a directory number bit map in a memory of the operation center, and determining if a numbered bit position of the directory number bit map which corresponds to a directory number of the AMA record is encoded with a binary bit "1";

the operation center further processing only those AMA records selected to be of interest; and the operation center discarding records not selected to be of interest.

3. A system for sorting automatic message accounting (AMA) records comprising:

means for receiving in the system all AMA records generated by a toll switching network, said AMA records including a directory number;

a central processing unit for implementing a filtering routine which discards AMA records which do not require further processing by the system;

a data array accessed by the filtering routine, the data array including a plurality of entries corresponding to number plan area (NPA) codes, wherein at least one entry in the data array includes a pointer, said pointer including a memory address location of a directory number bit map; and at least one directory number bit map identified by the pointer, wherein the bit map includes a plurality of numbered bit positions ranging from 1,111,111 to 9,999,999, and wherein said directory number in the AMA record received by the system matches one of said plurality of numbered bit positions in the bit map.

* * * * *